M. H. KASHIAN.
TROLLEY HEAD.
APPLICATION FILED NOV. 19, 1914.
1,237,787.
Patented Aug. 21, 1917.
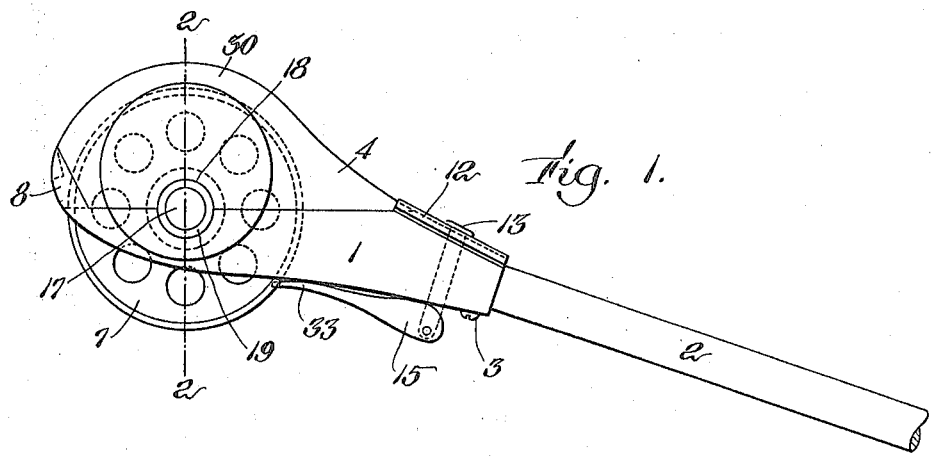
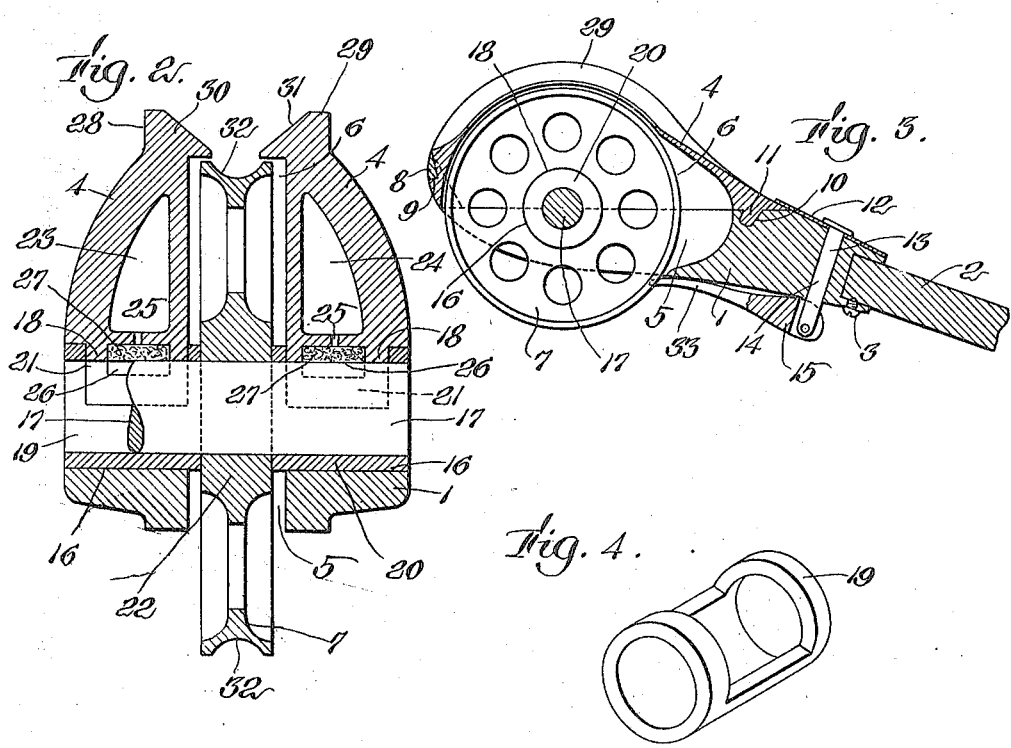

UNITED STATES PATENT OFFICE.

MINAS H. KASHIAN, OF AMESBURY, MASSACHUSETTS.

TROLLEY-HEAD.

1,237,787. Specification of Letters Patent. Patented Aug. 21, 1917.

Application filed November 19, 1914. Serial No. 872,897.

*To all whom it may concern:*

Be it known that I, MINAS H. KASHIAN, a citizen of the United States, and resident of Amesbury, county of Norfolk, State of Massachusetts, have invented an Improvement in Trolley-Heads, of which the following description, in connection with the accompanying drawings, is a specification, like letters on the drawings representing like parts.

My present invention is an improved trolley head, for use on electric railways. In my prior Patent 821,719, issued May 29, 1906, and in my copending application Serial No. 648,566 I have illustrated several forms of my inventions in trolley heads, and it is an object of the present invention to improve and perfect this type of trolley. It is a further object of the present invention to provide a trolley which shall permit the use of a comparatively small wheel and to provide a construction which will enable the wheel to be quickly and readily detached and attached and which, also, will serve as a guard for the wheel and provide a lubricating reservoir for the axle. As is well known, the wear on a trolley wheel is so great that such wheels require to be constantly renewed. Such wheels have usually been of relatively large diameter to provide a deep groove or high flanges to fit about the trolley wire and prevent the trolley running off the wire, as well as to secure a large current conducting area from the wire to the wheel. In my present invention, however, I utilize a wheel of very small diameter, so that the expense of renewal is reduced to a minimum and so construct the support and guard for the wheel as to act partially in the place of the deep flanges in the old trolley wheels, to prevent the trolley running off the wire. This feature is of special importance and furthermore enables a strong solid support for the wheel to be economically made.

Other novel features of the invention and details of construction will be hereinafter more fully pointed out and claimed.

Referring to the drawings,

Figure 1 is a side view of my improved trolley head;

Fig. 2 is an enlarged cross sectional view on the line 2—2 of Fig. 1;

Fig. 3 is a longitudinal view, partly in section, of the trolley head, as illustrated in Fig. 1; and Fig. 4 is a detailed view of one of the bushings for the axle.

I prefer to form the trolley head 1 so that it may be fitted on to the supporting trolley rod 2 and secured by a set screw 3 or the like. The head 1 constitutes the main supporting member for the wheel and axle, and is adapted to receive the guard and cover 4, which may be dovetailed to fit around the part 1 and to hold the axle of the wheel in its bushing. Both the parts 1 and 4 are slotted at 5 and 6 respectively, to receive and partially inclose the wheel 7. Any suitable dovetailed connection between the top 4 and part 1 may be provided, that herein shown consisting in a forwardly and upwardly extending flange 8 on the part 1, having a central recess therein, to receive the correspondingly formed projecting portion 9 of the outer end of the top 4 (see Fig. 3), and at the front of the head 1 is a recess 10 to receive a correspondingly formed projecting lug 11 on the under side of the top 4 adapted to fit therein. A rotatable spring locking member 12 is also provided to hold the parts 4 and 1 in assembled and locked position, the spring 12 being retained on the member 1 by a headed bolt 13 loosely fitting in a bored socket 14 through the part 1 and carrying a pivoted cam shaped member 15 on the opposite end. The cam 15 may be manipulated to release the holding tension of the bolt 13 on the spring 12 and thereupon the spring member 12 is partially rotated to free its overlapping part (see Figs. 1 and 3) from engagement with the top 4, when the latter may be instantly detached to permit removal of the wheel 7. The part 1 is formed with semi-circular sockets 16 for the axle 17, and the top 4 is correspondingly formed with similar sockets 18 to complete the journal bearings for said axle. Within the sockets thus formed and acting as a bushing for the axle 17, I provide removable bearings made of metal or composition or the like, 19 and 20. Each bushing has its central and uppermost portion cut away as indicated in Fig. 4, leaving the end portion of each bushing, however, complete. The recesses in the top 4 for the bearings of the axle 17 are formed with projecting portions 21 adapted to fit within the cut away part of the bushings 19 and 20, and thus retain these bushings in place. The projecting portions 21 and the width of the recesses in each bushing is preferably so formed as to permit the bushing to lie flush with the outer surface of the axle and each adjacent part of the journal bearings in the parts 1 and 4, as well as to constitute a rim bearing on the inner side for the hub 22 of the wheel 7 as clearly shown in Fig. 2.

In order to provide lubrication, I recess the upper member 4 either side of the slot 6 and over the journal bearings, as indicated at 23 and 24, boring small oil ports 25 downwardly to permit the oil to flow to the axle 17. In order to prevent too great a flow of oil, I prefer to slightly recess the projecting parts 21, as indicated at 26 and to fit therein a textile packing 27 through which the oil will seep from the recesses 23 and 24 through the ports 25 and on to said packing from whence it will be taken up directly by the rotating axle 17.

It is an important feature of my present trolley head to enable a wheel of relatively small diameter to be utilized which will be less expensive to manufacture and when worn out can be replaced at a minimum loss. To this end I prefer to form the top member 4 at either side of the slot 6 which receives the upper portion of the wheel 7, as a guard or shield for the trolley and the wire on which it runs, so as to prevent the trolley from leaving the wire, and to thus provide as deep a recess or, conversely, as widely extending flanges, as experience proves desirable. In former trolley wheel constructions these protecting flanges were on the trolley wheel itself, and hence were discarded when a wheel was thrown out, but in my invention these protecting flanges are on the fixed guard or head and take the place of the flanges on a wheel. As clearly shown in Fig. 2, the upper part of the portion 4 is provided with upwardly extending portions 28 and 29, projecting beyond the periphery of the wheel 7, and having beveled faces 30 and 31 respectively. Preferably these beveled faces will extend over the adjacent edges of the wheel 7 and may constitute practically a continuation of the internal groove 32 in said wheel. This groove may thus be made very shallow and the beveled faces 30 and 31 take the place of long flanges and prevent the trolley from leaving the wire when going around curves, "jumping" or the like. Ordinarily the wire will run smoothly in the shallow groove 32 and no friction between the wire and the beveled faces 30 and 31 will result, although should any friction occur it will be so slight as to be negligible.

I prefer to form the cam member 15 with an extended arm 33, which may act as a spring brush of appropriate length and contour to just fit within the shallow groove 32 of the wheel 7 and it will thus act not only to lock the cam 15 in the desired position when the plate 12 is under tension, but will also serve as an additional "brush" to aid in transferring current from the wheel to the head. This provision of means to apply a brush directly to the periphery of a wheel is believed to be a distinct novelty and is one of the advantageous features obtainable in my present invention where a trolley wheel of relatively small diameter is employed. Furthermore my invention enables a small wheel weighing approximately ¼ths of a pound to act as efficiently as the large wheels at present in use, weighing over 3 pounds and of proportionately greater cost, the necessity of making such old wheels of larger diameter to provide deep flanges being obviated by my construction. I may form the top portion 4 carrying the guard flanges 28 and 29 of hard steel to resist any wear which may occur through the contact therewith of the trolley wire, while the lower portion 1 preferably is made of soft malleable iron to constitute a strong support and good conductor of electrical energy. Furthermore, the lubrication is provided by simple cored oil reservoirs 23 and 24, and the removable bushing members 19 and 20 also enable a construction to be employed which has a minimum of parts and is of great simplicity, being all locked in assembled position by merely clamping the two sections 1 and 4 together.

Having described my invention, what I claim as new and desire to secure by Letters Patent is:

1. In an apparatus of the kind described, a trolley head, comprising two separable parts adapted to clamp the axle of a trolley wheel between them, and interlocking means to hold said parts together, one part having an oil recess, means to feed oil to the axle, a bushing for said axle and interlocking means between said parts and the bushing to hold said bushing in non-rotatable position.

2. In an apparatus of the kind described, a trolley head, comprising two separable parts adapted to clamp the axle of a trolley wheel between them, one of said parts having a depending lug, a removable bushing for the axle having a recess to interlock with the said depending lug, and means to hold said separable parts together, whereby the bushing is secured on the axle in non-rotatable position.

In testimony whereof, I have signed my name to this specification, in the presence of two subscribing witnesses.

MINAS H. KASHIAN.

Witnesses:
 JAMES R. HODDER,
 R. G. HERSEY.